United States Patent [19]

Gomes

[11] Patent Number: 4,807,330
[45] Date of Patent: Feb. 28, 1989

[54] PIVOT HINGE

[75] Inventor: Daniel Gomes, Bloomington, Ind.

[73] Assignee: Abra, Inc., Bloomington, Ind.

[21] Appl. No.: 468,141

[22] Filed: Feb. 22, 1983

Related U.S. Application Data

[63] Continuation-in-part of Ser. No. 371,604, Apr. 26, 1982, Pat. No. 4,482,186.

[51] Int. Cl.⁴ .............................................. E05D 7/10
[52] U.S. Cl. ...................................... 16/261; 16/273; 16/380; 16/386
[58] Field of Search ................. 16/273, 380, DIG. 27, 16/DIG. 33, 386, 228, 383, 254, 257, 261, 263, 275; 403/161–163, 91, 119; 297/56, 374, 375

[56] References Cited

U.S. PATENT DOCUMENTS

| | | | |
|---|---|---|---|
| 778,413 | 12/1904 | Kilmon | 16/386 X |
| 1,594,415 | 8/1926 | Kalgren | 16/386 X |
| 2,556,449 | 6/1951 | Scheeler | 16/380 |
| 2,615,501 | 10/1952 | Neiborn | 97/403 |
| 2,701,384 | 2/1955 | Barroero | 16/378 |
| 2,817,871 | 12/1957 | Ferry | 16/263 X |
| 2,820,509 | 1/1958 | Moreland | 16/275 |
| 2,964,341 | 12/1960 | Doyle et al. | 403/162 |
| 3,000,049 | 9/1961 | Ferry, Jr. | 16/386 X |
| 3,013,297 | 12/1961 | Ferry | 16/263 X |
| 3,015,126 | 1/1962 | Ahlgren | 16/386 |
| 3,068,508 | 12/1962 | Heyer | 16/386 |
| 3,151,909 | 10/1964 | Gerdetz | |
| 3,539,234 | 11/1970 | Rapata | 403/119 |
| 3,725,973 | 4/1973 | Gwozdy | 16/273 |

FOREIGN PATENT DOCUMENTS

| | | | |
|---|---|---|---|
| 2316899 | 11/1977 | France | 355/297 |
| 520313 | 4/1940 | United Kingdom | 155/117 |
| 765094 | 1/1957 | United Kingdom | 297/441 |

OTHER PUBLICATIONS

Stafast Products, Inc., "Joint Connector Systems".
Stafast Products, Inc., "K–D Fasteners" and Joint Connector Systems.
Morokoshi Screw Manufacturing Company, Ltd., Japan, "Selection Guide 1983".

*Primary Examiner*—Frank T. Yost
*Assistant Examiner*—James L. Wolfe
*Attorney, Agent, or Firm*—Barnes & Thornburg

[57] ABSTRACT

A pivot hinge has two pivot members for engaging bores in two parts to be rotatably coupled to each other. Each pivot member has a first portion sized for insertion into one of the bores. Either a single continuous rib or a plurality of rib segments are formed on the outer surface of the first portion for gripping the inner surface of the bore. Either one or both of the pivot members has a second portion which provides a thrust bearing between the two joined parts. The two pivot members are coupled to each other by a bearing which allows each member to rotate independent of the other and a releasable lock mechanism which, when engaged, prohibits lateral separation of the two pivot members and, when disengaged, permits separation of the two members to allow separation of the parts.

18 Claims, 3 Drawing Sheets

PIVOT HINGE

This application is a continuation-in-part of my copending application Ser. No. 371,604, filed Apr. 26, 1982, now U.S. Pat. No. 4,482,186 entitled "Jointed Article of Furniture."

This invention relates to articles of furniture having movable parts, and more particularly to improvements in pivot joints for rotatably coupling the parts.

Articles of furniture having frame members which pivot about each other are well known in the prior art. Heretofore, the pivot joints have created problems for both the manufacturers and users of the furniture. Many of the problems can be attributed to the fact that the joints are made of materials which are incompatible with and cannot be easily bonded to the material of the frame members. This adhesion incompatibility between the material of the joint and the frame members results in construction weakness and joint failure.

Typically, a pivot joint is made by using a metal T-bolt or rivet which is inserted through corresponding holes drilled in wooden frame members. A nut or possibly a nut and a lock washer are secured to the bolt to retain it in the hole. Besides the aesthetically displeasing appearance of T-bolts, the bolt and nut often work themselves loose. This requires frequent tightening of the bolt, and in some cases results in the loss of the bolt. A rivet requires crimping or other manufacturing processes to retain it in the hole. These manufacturing processes usually cannot be performed by the user; thus, rivets cannot be used in kits where the user assembles the various members. Exposure to weather will many times cause the T-bolt, nut, or rivet to rust, thereby further detracting from the aesthetic appearance of the article of furniture.

The use of T-bolts also adds to assembly time and manufacturing costs. It is time-consuming to install a T-bolt at all necessary joints, and then to affix and tighten the nuts to each of the bolts. While rivets are more commonly used as pivot joints because they are easier to assemble than T-bolts, they cannot be provided in kits and they also have many of the same deficiencies as T-bolts, e.g., aesthetic appearance and adhesion incompatibility with the material of the frame members. The pivot joint of the present invention eliminates these and other problems heretofore associated with jointed articles of furniture. An article of furniture which includes pivot joints embodying the present invention requires less time to assemble, is cheaper to manufacture, and is aesthetically more pleasing because they are hidden from view.

Articles of furniture embodying the pivot joint of the present invention are both more aesthetically pleasing and functionally superior to pivot joints known in the prior art.

One aspect of the present invention is to provide a pivot hinge which has less parts for assembly and which is relatively inexpensive to manufacture.

The pivot hinge embodying the present invention is rustproof, durable, and in at least some applications can be attached to furniture parts without using an adhesive or other bonding agent.

In one embodiment, the pivot hinge has two members for insertion into bores in the parts to be joined. One of the pivot hinge members has two portions molded as a single unit. A first portion has a leading end sized for insertion into the bore. The outer surface of the first portion may include a single circumferentially extending rib, but preferably includes multiple rib segments. A second portion of the one hinge member has an outer dimension which is greater than the inner dimension of the bore so that it provides a thrust bearing between the two joined parts. A second member of the pivot hinge has the same features, except that it may not have a second portion. The pivot hinge further includes a bearing for coupling together the two members to allow them to rotate relative to each other and a retainer for prohibiting separation of the members.

In a preferred embodiment of the pivot hinge, the outer surfaces of the first portions are tapered outward from the leading ends. The rib segments have generally the same outer dimension so that the height of each rib from the outer surfaces of the first portions becomes progressively greater toward the leading ends. The outer dimension of the ribs is generally greater than the inner dimension of the bore into which the first portion is inserted.

Another aspect of the present invention is to provide a pivot hinge which can be releasably locked to allow separation of the two joined parts.

In one embodiment, pivot hinge members are rotatably carried on bearing means to allow the members to rotate relative to each other. The pivot hinge includes a releasable locking means which, when engaged, prohibits lateral separation of the two hinge members on the bearing means and, when disengaged, permits at least one of the members to be removed from the bearing means to allow separation of the parts.

Various features and advantages of the present invention will become apparent in view of the following detailed description of an embodiment thereof exemplifying the best mode of carrying out the invention as presently perceived, which description should be considered in conjunction with the accompanying drawings, in which.

For purposes of illustrating the present invention, a rockerless rocker is shown as the article of furniture 10. However, the present invention may be adapted to various jointed articles of furniture without departing from its scope. Thus, it is not intended that the invention be limited to any particular article of furniture.

Figure 1:
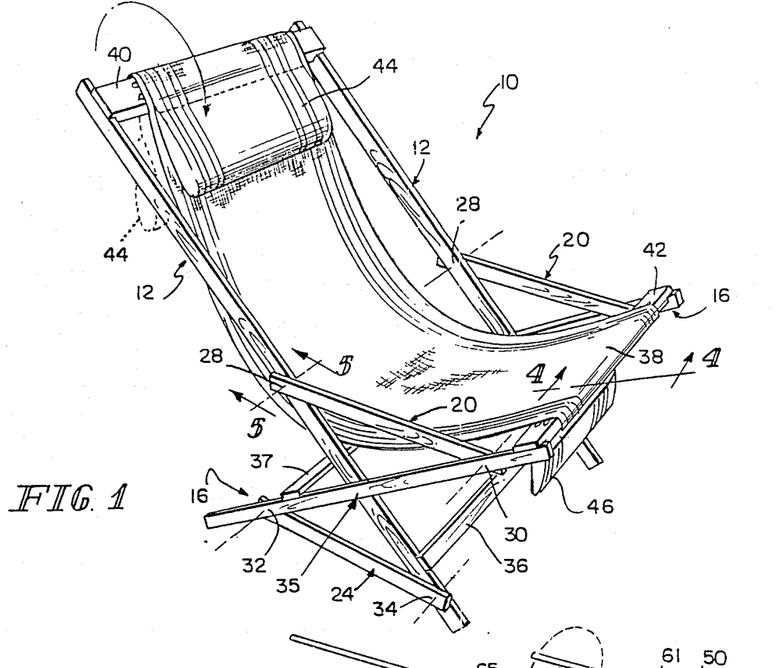
FIG. 1 is a perspective view of an article of furniture embodying the present invention.

Referring to FIG. 1, the article of furniture 10 having jointed members pivotally movable with respect to each other includes a first pair of side frame members 12 and a second pair of frame members 16. First frame members 12 are pivotally joined to second frame members 16 by upper struts 20 and lower struts 24. Upper strut 20 pivotally joins frame member 12 to frame member 16 at pivot connections 28 and 30. Lower strut 24 pivotally joins frame member 12 to frame member 16 at pivot connections 32 and 34. In the illustrative embodiment, struts 20 and 24 are pivotally connected to the outer surface of frame member 12, and pivotally connected to the inner surface of frame member 16. Thus, frame member 12 and frame member 16 are maintained in a spaced parallel relationship which enables them to move relative to each other at a cross or junction point 35 without rubbing.

It should be noted that frame members 12, 16 are not joined at cross point 35, and that cross point 35 is not a fixed point about which frame members 12, 16 pivot. Rather, cross point 35 only represents the point of intersection of frame members 12, 16 as they move relative to each other in response to the pivoting of the frame members 12, 16 and struts 20, 24 about pivot connections 28, 30, 32, 34.

Base braces 36, 37 join the first pair of side frame members 12 and the second pair of side frame members 16, respectively, near the lower end of the frame members 12, 16. The braces 36, 37 serve to maintain a spaced parallel relationship between the side frame members 12, 16 on one side of the chair 10 and the side frame members 12, 16 on the other side. The braces 36, 37 also serve to strengthen the structure of the chair 10.

The article of furniture further includes a seat 38 made of flexible sheet-like material. One of the ends of the seat 38 is attached to an upper brace 40 and the other end is attached to a lower brace 42 so that a seat sling is provided having a seat well and a seat back. A pillow 44 is attached to upper brace 40 and is movable between a usable position on the seat back, as shown by the solid lines in FIG. 1, and a storage position behind the seating area as shown by the dotted lines in FIG. 1. A pouch 46 is attached to lower brace 42. Pouch 46 may be used to store books, cigarettes, keys, or other articles. While a pillow 44 and pouch 46 have been shown as examples of accessory appendages which may be attached to the article of furniture 10, other appendages, such as a back (lumbar) cushion and seat cushion, could be attached without departing from the scope of the invention.

Figures 2, 3, 4, 5:
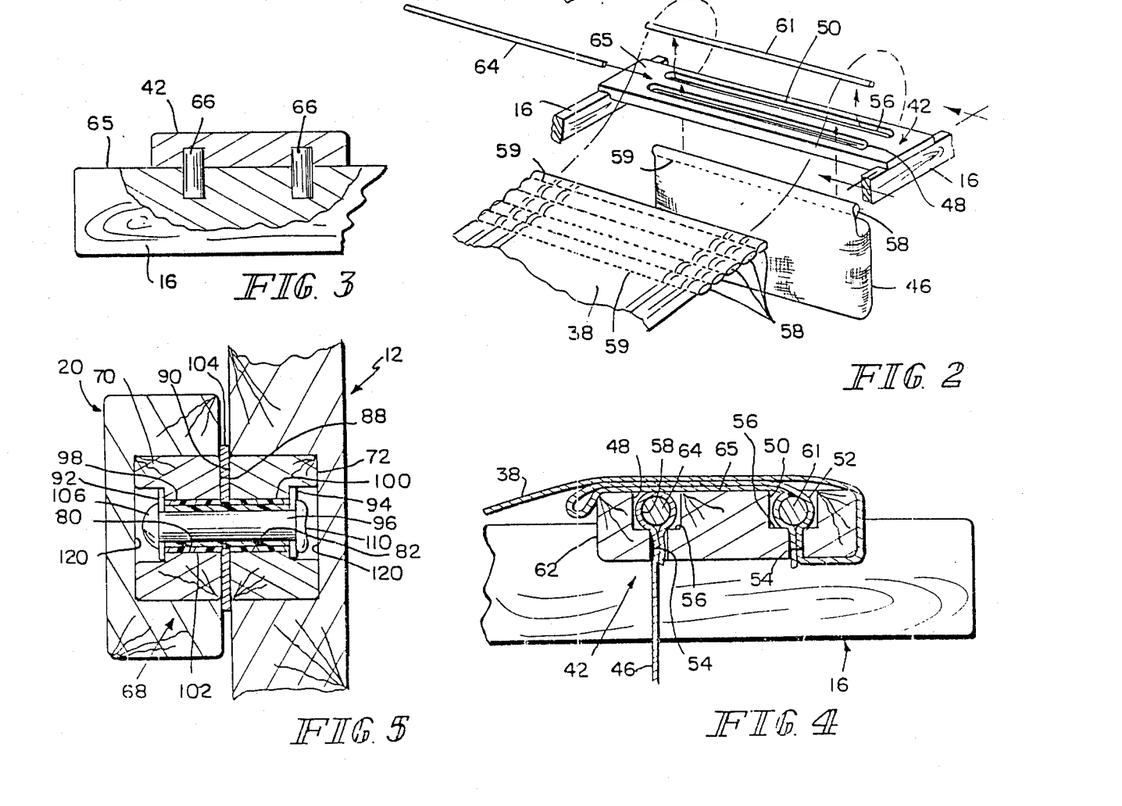
FIG. 2 is an exploded view of a portion of the article of furniture showing the seat and accessory attachments to the frame.
FIG. 3 is a fragmentary view, partly cross-sectioned, of the article of furniture shown in FIG. 1, taken generally along lines 3—3 of FIG. 2.
FIG. 4 is a cross-sectional view of the article of furniture shown in FIG. 1, taken generally along lines 4—4 of FIG. 1.
FIG. 5 is a cross-sectional view of a portion of the article of furniture, taken generally along lines 5—5 of FIG. 1 showing the pivot joint embodying the present invention.

Referring to FIG. 2, one of the two seat and accessory attachment means embodied in the present invention is shown. It will be appreciated that both attachment means have the same construction. The lower brace 42 serves as a seat and accessory support member, and is securely attached to frame member 16 generally perpendicular thereto. Two longitudinal slots 48, 50 are provided in the brace 42 in spaced parallel relationship to each other. As shown in FIG. 4, the slots 48, 50 include an upper section 52, a lower section 54, and an intermediate shoulder section 56.

Referring to FIG. 3, lower brace 42 is attached to side frame members 16 employing pegs 66 which are securely received into openings on the underside of lower brace 42 and on the upper side of side frame member 16. In the illustrative embodiment, pegs 66 are made of wood, as are frame members 16, and lower brace 42. The pegs 66 are secured to lower brace 42 and frame member 16 by applying glue to the surface of the pegs 66 or to the openings into which they are received, inserting the pegs 66 into the openings on either the frame member 16 or lower brace 42, and then mating the openings on the member not containing the pegs 66 to the pegs 66 which are glued in the openings of the other corresponding member. Upper brace 40 is also attached to frame members 12 in this manner. It will be appreciated that the braces or support members 40 and 42 may be attached to the side frame members 12 and 16 employing other conventional means without departing from the scope of the present invention.

One feature of the accessory attachment means embodying the present invention is that the attachment between the braces 40 and 42 and the side frame members 12 and 16 can be made permanent, while the seat 38 can still be easily adjusted and/or removed. This feature makes the furniture 10 more durable and simpler to maintain. Heretofore, the attachment between the seat support braces 40 and 42 and the frame members 12 and 16 could not be made permanent if the seat 38 was to be adjustable or removable.

Referring to FIGS. 2 and 4, the seat 38, pillow 44, and accessory pouch 46 are attached in the following manner. For illustrative purposes, FIGS. 2 and 4 show the attachment of seat 38 and pouch 46 to the lower brace 42. However, it will be appreciated that seat 38 and pillow 44 are attached to upper brace 40 in a like manner. Seat 38, pillow 44, and pouch 46 are made of flexible material. Cylindrical openings 58 are provided in one end of both the pillow 44 and pouch 46 and in both ends of the seat sling 38. The openings 58 extend in substantially the same direction as the longitudinal slots 48, 50 in the braces 40 and 42 and are continuous from one side edge of the seat material to the other. As can best be seen in FIG. 2, there can be a single cylindrical opening 58, as shown in the pouch 46, or a series of cylindrical openings 58 as shown in the seat sling 38. The plurality of cylindrical openings 58 in seat 38 provides an adjustment means for the seat 38, as will be explained later.

The cylindrical openings 58 are preferably made by overlapping the end of the material forming the seat sling 38 and sewing seams 59 across the material. The seams 59 are sewed substantially parallel to each other, and are spaced far enough apart to provide space for the insertion of a rod 61. The rod is sized and shaped to be small enough to be received by the upper section 52 of the longitudinal slot 50 in the brace 42, but large enough so that it will not pass through the lower section 54 of the longitudinal slot 50, when the rod is inserted into one of cylindrical openings 58 in the seat sling 38.

As shown in FIGS. 2 and 4, the end of the seat sling 38 including the cylindrical openings 58 is extended over the brace 42, around the front edge of the brace 42, and up through longitudinal slot 50 from the bottom of the brace 42. The end of seat 38 is pulled far enough through the slot to achieve the adjustment desired by the user. The rod 61 is then inserted into one of the cylindrical openings 58. The seat 38 is then pulled back through the longitudinal slot 50 until the rod 61 seats on the intermediate shoulder section 56 of the longitudinal slot 50. The shoulder 56 and narrowed lower section 54 of longitudinal slot 50 prevent the rod from being pulled completely back through the brace 42. The weight of the occupant of the seat 38 will force rod 61 against the shoulder 56 so that it remains firmly seated in the longitudinal slot 50.

If the rod 61 is inserted into a cylindrical opening other than the opening 58 closest to the end of the seat sling 38, some material will hang out of the longitudinal slot 50, as shown in FIG. 4. This overhang can be folded back under the seat sling 38. In this manner, the overhanging portion of the end of the seat 38 is hidden from view, as it is covered by remaining seat 38 material.

Pouch 46 is attached to the lower brace 42 by first inserting the end of the pouch 46 including the opening 58 upward through the bottom of the slot 48 in brace 42 and inserting a rod 64 into the opening 58. By pulling downward on the pouch 46, the rod 64 seats on the shoulder section 56 of the slot 48 in a manner similar to rod 61 in slot 50. As shown in FIG. 4, rod 64 and cylindrical opening 58 are hidden from view by the overlap of seat 38 on the upper edge 65 of the lower brace 42.

Figure 6:
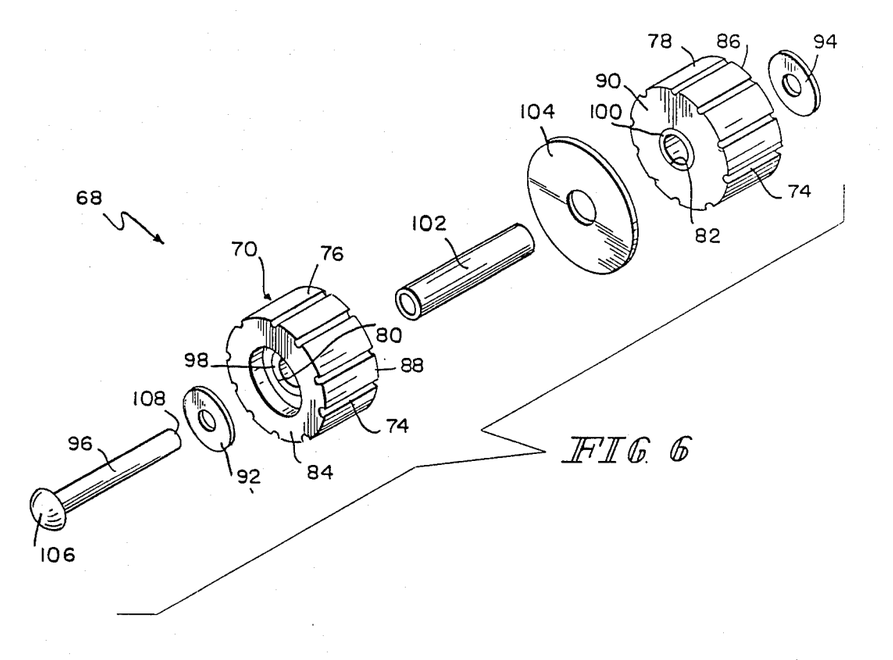
FIG. 6 is an exploded view of the pivot joint shown in FIG. 5.

Referring to FIGS. 5 and 6, a pivot mechanism 68 embodying the present invention includes a pair of dowels 70, 72. In the illustrative embodiment, the dowels 70, 72 are cylindrically shaped, and a plurality of radially spaced-apart troughs or notches 74 extend axially on the circumferential surfaces 76 and 78 of the dowels 70, 72, respectively. The circumferential surfaces 76 and 78, however, may be of any shape desired by the manufacturer. Furthermore, the troughs 74 could be cut in other shapes, such as a spiral, as is commonly done without departing from the scope of the present invention. Dowels 70, 72 include cylindrical bores 80, 82 which extend axially through the center of the dowels 70, 72. Cylindrical bores 80, 82 are not of uniform circumference throughout their length. In proximity to the axially outer surfaces 84, 86 of the dowels 70, 72, the bores 80, 82 have a greater diameter than the diameter of the remainder of the bores 80, 82. Thus, the diameter of the bores 80, 82 in proximity to the axially inner surfaces 88, 90 is less than the diameter of the bores 80, 82 at the axially outer surfaces 84, 86. The enlarged diameter near the axially outer surfaces 84, 86 is sized to receive retaining washers 92, 94. Retaining washers 92, 94 each include an opening having an inner diameter which is sized to receive a post or rivet 96.

In the illustrative embodiment, sleeves 98, 100 are inserted into the cylindrical bores 80, 82 and extend partially therethrough. The outer surface of the sleeves 98, 100 is sized to be snugly received by the smaller-diametered portion of the cylindrical bores 80, 82. The sleeves 98, 100 are of sufficient length to extend along the smaller-diametered portions of the cylindrical bores 89, 82 but not so long so as to extend into the wider-diametered portion of the cylindrical bore 80, 82. Cylindrical bearing 102 is sized to be rotatably received in the sleeves 98, 100 and washer 104, and to rotatably receive the post or rivet 96. The bearing 102 is of sufficient length to extend through the sleeves 98, 100 and washer 104 when the pivot mechanism 68 is assembled as is shown in FIG. 5. Preferably, sleeves 98, 100 are made of a material different than bearing 102 so that sleeves 98, 100 and bearing 102 may rotate relative to each other with a minimum degree of friction. In bearings of this type, it is desirable that one of the bearing surfaces (either on the sleeves 98, 100 or on the bearing 102) be softer than the other bearing surface. It has been found that a nylon bearing 102 and teflon or delrin sleeves 98 and 100 satisfactorily achieve this objective, although other similar types of material may be used, keeping in mind the desirable difference in materials between the bearing 102 and sleeves 98 and 100. Washer 104 has an outer diameter which is slightly greater than the outer diameter of dowels 70, 72. Washer 104 serves to separate the axially inner surfaces 88, 90 of dowels 70, 72, and acts as an entering stop when the dowels 70, 72 are press-fitted into the frame members. Washer 104 should be made of a non-corrosive material, such as brass or plastic.

It will be appreciated that the pivot mechanism 68 may be constructed without the sleeve inserts 98 and 100. In the alternative embodiment, bearing 102 would be inserted into the bores 80 and 82. The bearing 102 would be primarily rotatable about the post or rivet 96. One advantage of sleeve inserts 98 and 100 is that they facilitate rotation of the dowels 70 and 72 relative to the bearing 102, thus increasing the efficiency of operation of the mechanism 68, and they also provide longer wear. Further, post 96 and bearing 102 could be a single unit constructed of nylon, and be used either with or without sleeves 98 and 100. The combined post 96 and bearing 102 unit could be provided with a head on one end and the other end deformed by heat to retain the dowels 170 and 72 thereon.

In assembling the mechanism 68, sleeves 98, 100 are inserted into cylindrical bores 80, 82. Bearing 102 is inserted through washer 104 and into the sleeves 98, 100. Dowels 70, 72 are pushed toward each other, and are separated and centered by the washer 104. Post 96 passes through retaining washer 92, bearing 102, and retaining washer 104, placing the dowels 70, 72 in proper relation to each other. Post 96 contains a head 106 and a distal end 108. When pivot mechanism 68 is fully assembled, the distal end 108 of post 96 protrudes slightly past the retaining washer 94. The distal end 108 includes attachment means for retaining the dowls 70 and 72 on the post 96 in proximal relationship to each other. The attachment can be achieved by crimping the distal end 108 of the post 96, as is shown in FIG. 5 at 110, or by using a threaded nut or screw (not shown) and a lock washer (not shown). With a combined post 96 and bearing 102 unit, attachment can be achieved by heat-treating one or both of the ends of the combined unit. Dowels 70, 72 are preferably made of a material which has adhesion compatability with the material of the frame members 12 and 16. This adhesion compatability should provide good bonding surfaces between the dowels 70 and 72 and the frame members 12 and 16 for ease and permanence of assembly. In the illustrative embodiment, the dowels 70 and 72 are made of wood and the frame membes 12 and 16 are also made of wood. Thus, the materials of the dowels 70 and 72 and frame members 12 and 16 have good adhesion compatability. However, other materials could be used having adhesion compatability to produce a durable and permanent connection without departing from the scope of the invention.

Referring to FIG. 5, the pivot mechanism 68 is shown when fully assembled and operational. Frame member 12 and upper strut 20 contain recesses or truncated bores 120 which are sized and shaped to receive dowls 70 and 72. Pivot mechanism 68 is securely attached to frame member 12 and strut 20 by applying glue to the circumferential surfaces 76, 78 of dowels 70, 72 and to the inner surface of the truncated bores of frame member 12 and strut 20. The dowels 70 and 72 are press-fitted into the truncated bores 120. The dowels 70, 72 should be held securely in the truncated bores 120 to prevent rotation of the dowels 70, 72 relative to the frame member 12 and strut 20, and further to prevent lateral separation of the frame member 12 and strut 20. Since the dowels 70, 72, the strut 20, and the frame member 12 are made of materials which are compatabile for adhesion and bonding, a glue will serve to secure the dowels 70, 72 in the truncated bores 120. The dowels 70, 72 are held statically in strut 20 and frame member 12, respectively. Therefore, any movement of dowel 70, 72 will be possible only through movement of strut 20 or frame member 12. Bearing 102, however, is rotatable in sleeves 98, 100, thereby allowing frame members 12, frame members 16, and struts 20 and 24 to rotate relative to each other. Washer 104 serves as a spacer to maintain a separation between strut 20 and frame member 12, thereby enhancing the rotatability of strut 20 with respect to frame member 12 and minimizing the friction between axially inner surfaces 88 and 90 of the dowels 70 and 72 and the adjacent surfaces of the frame members 12 and 16 to prevent surface scratching or rubbing.

As described above, the manufacturing process for the article of furniture is enhanced by the ease with which the pivot assembly 68 can be assembled. Further, use of the pivot assembly 68 enables all joints to be hidden and thus improves the aesthetic appearance of the article of furniture. Any metal portions of the joint are concealed and protected against exposure to the environment. Thus, they are protected from rust, and any rust which may form is concealed. The use of dowels 70, 72 constructed of material which is compatible for adhesion and bonding the frame members 12, 16 and struts 20, 24 provides for secure attachment of the pivot assembly 68 to the respective frame components without the use of nails, screws, staples, or other mechanical attachment means.

Figure 7A:
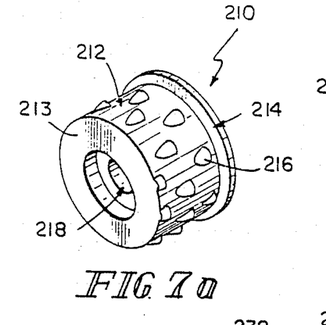
FIGS. 7a, 7b, and 7c are perspective views of three pivot joint members embodying the present invention.
Figure 7B:
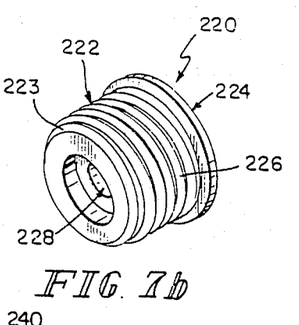
Figure 7C:
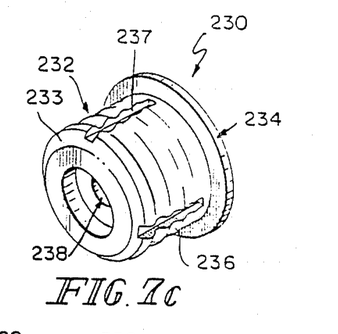

Additional embodiments of the dowels or pivot hinge members are shown in FIGS. 7a, 7b, and 7c. The hinge members 210, 220, and 230 are molded from a synthetic material, such as, for example, ABS plastic. Each pivot hinge member 210, 220, and 230 is molded as a single unit. These members 210, 222, and 230 reduce the number of parts required for assembly of a pivot hinge embodying the present invention. Thus, use of members 210, 220, and 230 increase the cost efficiency of the pivot hinge.

The pivot hinge member 210 includes a generally cylindrical-shaped portion 212 having a leading end 213 which is sized for insertion into a bore in a part to be joined. The member 210 also includes a peripheral flange or lip 214 which, as will be explained later, provides a thrust bearing between the two joined parts. A plurality of rib segments 216 are formed on the circumferential outer surface of the portion 212. Each rib segment 216 extends circumferentially. The rib segments 216 are spaced apart intermittently on the outer surface of portion 212. In a preferred embodiment, the rib segments 216 extend circumferentially in a helical path. Thus, when the portion 212 is inserted into a bore in the part to be joined, the rib segments 216 grip the interior of the bore to secure the pivot member 210 in fixed relationship to the part. An opening 218 extends axially through pivot member 210 and receives a bearing post (not shown).

The pivot hinge member 220 includes a generally cylindrical-shaped portion 222 having a leading end 223 with a chamfer which is sized for insertion into a bore in a part to be joined. The pivot member 220 also includes a peripheral flange or lip 224 which provides a thrust bearing between the two joined parts. A single circumferentially extending rib 226 is formed on the circumferential outer surface of the portion 222. The rib 226 extends circumferentially in a helical path around the portion 222. The pivot member 220 also includes an opening 228 extending axially therethrough for receiving a bearing post.

The pivot hinge member 230 includes a generally cylindrical-shaped portion 232 having a leading end 233 with a chamfer which is sized for insertion into a bore in a part to be joined. The pivot member 230 also includes a peripheral flange or lip 234 which provides a thrust bearing between the two joined parts. It will be appreciated that flange 234 has an outer diameter greater than the inner diameter of the bore into which the portion 232 is inserted. A plurality of rib segments 236 are formed on the circumferential outer surface 240 (shown in FIG. 8) of the portion 232. Each rib segment 236 extends circumferentially and is generally parallel to the other rib segments 236. The rib segments 236 are defined by axially extending notches 237 formed in the outer surface 240 of the portion 232. The pivot member 230 also includes an axially extending opening 238 for receiving a bearing post.

It should be noted that the ribs 216, 226, and 236 on pivot members 210, 220, and 230, respectively, provide means for gripping the interior of the bore into which the portions 212, 222, and 232 are inserted. Thus in some applications, pivot members 210, 220, and 230 can be secured in a fixed relationship with respect to a part by press-fitting the portions 212, 222, and 232 into the bores. The gripping interrelationship between the ribs 212, 222, and 232 and the interior of the bore will prevent relative movement between the part and the pivot members 210, 220, and 230. In other applications, it may be necessary to use a glue or other adhesive. The intermittent spacing of the rib segments 216 on pivot member 210 allows the adhesive to pass between the rib segments 216. The axially extending notches 237 on pivot member 230 allow the glue to circulate between the rib segments 236. By providing a texture on the outer surfaces of the portions 212, 222, and 232, close tolerance problems between these portions and the inner surfaces of the bores are eliminated. Further, the texturing assures that as much surface as possible of the portions 212, 222, and 232 contacts the inner surfaces of the bores. This is needed to ensure a tight fit in the bores.

Figures 8, 9, 10, 11A, 11B:
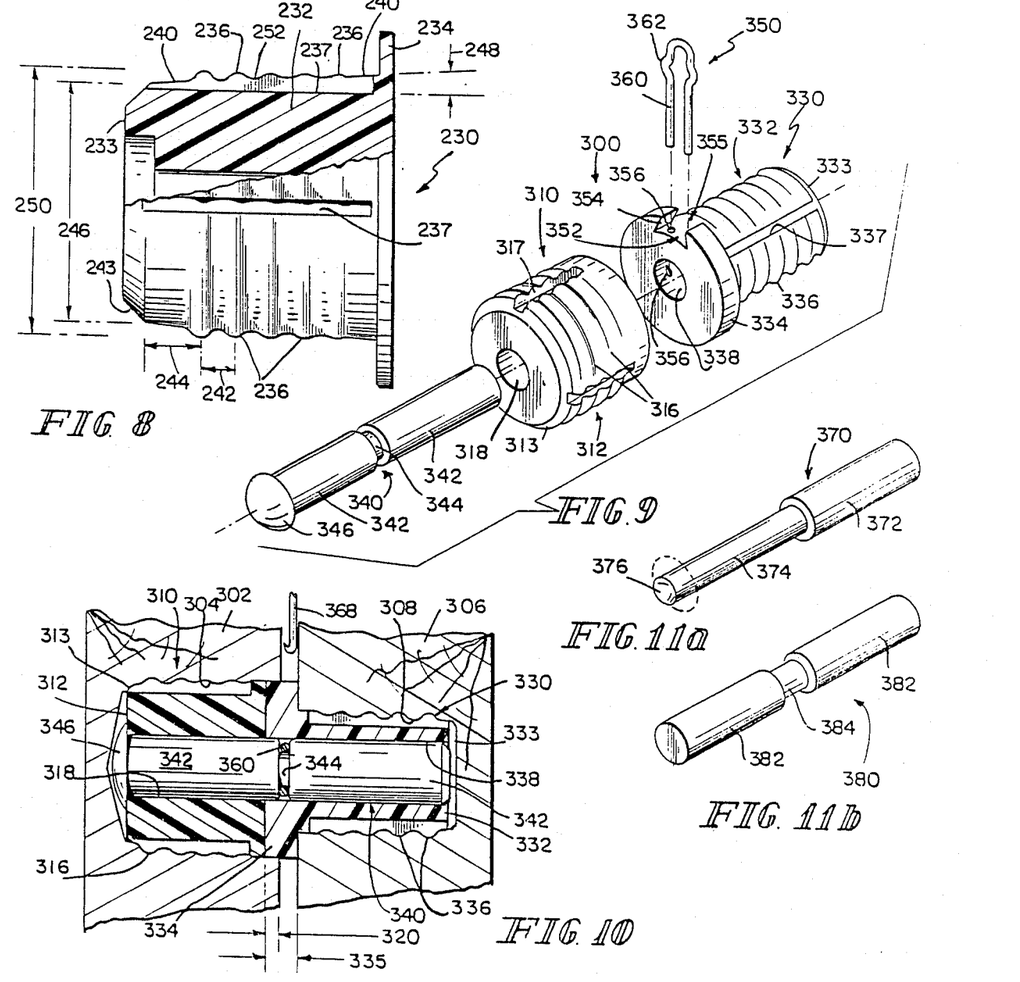
FIG. 8 is a transverse view, partly broken away and cross-sectioned, of pivot joint member shown in FIG. 7c.
FIG. 9 is an exploded view of a pivot joint having a releasable lock embodying the present invention.
FIG. 10 is a cross-sectional view of two joined parts and the pivot joint shown in FIG. 9.
FIGS. 11a and 11b are perspective views of two alternative embodiments of bearing posts for use with the releasable lock shown in FIGS. 9 and 10.

The particular structural features of the portion 232 of pivot member 230 are shown in FIG. 8. In a preferred embodiment, the rib segments 236 on the outer surface 240 of portion 232 are axially spaced apart a distance 242 of approximately 0.070 inch. The rib segments 236 closest to the leading end 233 are axially spaced from the chamfer 243 a distance 244 of approximately 0.110 inch. As shown in FIG. 8, the circumferential outer surface 240 of the portion 232 is tapered outward from the leading end 233 toward the flange 234. The diameter 246 of the portion 232 adjacent the leading end 233 is approximately 0.740 inch. The diameter 250 of the portion 232 adjacent the flange 234 is approximately 0.770 inch. The slope of the outer surface 240 from the leading end 233 to the flange 234 is an angle 248 of approximately 1.5°.

As best seen in FIG. 8, each rib segment 236 is rounded. Each circumferential ring of rib segments 236 has an outer diameter generally equal to the outer diameter 250 of the portion 232 adjacent the flange 234. Thus, as the ribs 236 progress toward the leading end 233, their height from the surface 240 becomes greater. This means that the valleys 252 between adjacent axially spaced rib segments 236 become progressively deeper toward the leading end 233.

In the preferred embodiment, five rib segments 236 are spaced axially apart on the surface 240. Axially extending notches 237 separate the rib segments 236 into four groups. The chamfer 243 and slope 248 of the surface 240 allow the pivot member 230 to be forced into a bore, usually without having to hold it. Thus it is relatively easy to pound the pivot member 230 into the bore with a rubber mallet. The slope 248 of the surface 240 is provided to maintain a force-fit contact between the inner surface of the bore and as much surface area of the portion 232 of the pivot member 230. The diameter 250 of portion 232 will be greater than the inner diameter of the bore. As the pivot member 230 is being forced into the bore, the portions of the inner surface of the bore near the surface of the part will tend to spring back less and less as each rib segment 236 passes. Because of the gradually increasing depth of the valleys 252 toward the leading end 233, surface contact between the portion 232 and the bore should be great. Near the bottom of the bore, fewer ribs will have passed along the inner surface of the bore, and thus the inner surface should fill the deeper valleys 252 on the surface 240.

A pivot hinge 300 for rotatably joining a part 302 having a bore 304 and a part 306 having a bore 308 is shown in FIGS. 9 and 10. The pivot hinge 300 includes means 350 for releasably locking the two pivot members 310 and 330. When engaged, the released locking means 350 prohibits lateral separation of the two pivot members 310 and 330, and when disengaged, permits one of the two pivot members 330 to be removed from the bearing post to allow separation of the parts 302 and 306. As best shown in FIG. 10, the bore 304 has an inner diameter greater than the bore 308. The reason for this difference in diameter will be explained later.

Pivot member 310 is constructed in a similar manner to pivot member 230 (shown in FIGS. 7c and 8). Pivot member 310 includes a generally cylindrical-shaped portion 312 having a leading end 313 with a chamfer which is sized for insertion into the bore 304 of part 302. Rib segments 316 extend circumferentially on the outer surface of portion 312 and are segmented by axially extending notches 317. The rib segments 316 have the same structure as the rib segments 236 shown in FIG. 8. Pivot member 310 includes an axially extending opening 318 which receives a bearing post 340. It should be noted that pivot member 310 does not include a peripheral flange or lip. Thus pivot member 310 can be recessed into bore 304 a distance 320, as shown in FIG. 10. In a preferred embodiment, this recess 310 is approximately 0.0625 inch.

Pivot member 330 includes a generally cylindrical-shaped portion 332 having a leading end 333 with a chamfer which is sized for insertion into the bore 308 of part 306. Pivot member 330 does include a peripheral flange or lip 334 similar to that of pivot member 230. As shown in FIG. 10, the flange 334 has a thickness 335 of approximately 0.125 inch. Rib segments 336 are formed on the outer surface of portion 332 and have the same structure as the rib segments 236 shown in FIG. 8. The rib segments 336 are segmented by axially extending notches 337.

As can be seen in FIG. 10, the flange 334 has an outer diameter generally equal to the inner diameter of bore 304 so that it extends into the recess 320 when the two parts 302 and 306 are joined. Flange 334 serves to separate parts 302 and 306 and to further provide a thrust bearing between the two parts 302 and 306. In the preferred embodiment, the separation between the two parts 302 and 306 is approximately 0.0625 inch or approximately one-half of the width 335 of flange 334.

A bearing post 340 is received in the openings 310 and 338 of the pivot members 310 and 330. Bearing post 340 allows each pivot member 310 and 330 to rotate independently of the other. As shown in FIG. 9, bearing post 340 includes two end sections 342 and an intermediate section 344 having a reduced diameter. A head 346 is formed on one end of the bearing post 340. When the bearing post 340 is inserted through the openings 318 and 338, head 346 engages the leading end 313 of pivot member 310. Further, as shown in FIG. 10, the intermediate portion 344 of bearing post 340 is positioned in the opening 338 radially inward from the flange 334 of pivot member 330. The reduced intermediate portion 344 cooperates with the releasable locking means 350 to prohibit lateral separation of the two pivot members 310 and 330 and the parts 302 and 306.

The releasable locking means 350 includes a radial section 352 of the flange 334 having angular walls 354 providing an opening 355 on the circumference of the flange 334 which becomes wider as it extends radially inward. Two spaced-apart holes 356 extend inward from the flange section 352 to the opening 338. The holes extend transverse to the axis of pivot member 330 and are spaced apart a distance generally equal to the diameter of the reduced portion 344 of the bearing post 340. The holes 356 are formed so that when the bearing post 340 is inserted through the openings 310 and 338 the reduced intermediate portion 344 aligns with the holes 356. A generally U-shaped pin 362 is inserted through the holes 356. The pin 360 includes projections 362. Pin 360 is constructed of a flexible material which allows the protrusions 362 to flex inward to pass through opening 355 and to spring outward to retain the pin in the holes 356. The pin 360 extends past the reduced portion 344 of the bearing post 340 and engages the end portions 342 of the bearing post 340 to lock the two pivot members 310 and 330 together and prohibit their lateral separation. Pin 360 is removable to release the lock by inserting a hook 368 between the two parts 302 and 306 to engage the pin 360. By pulling the pin 360 out of the holes 356, separation of the two pivot members 310 and 330 is permitted, thereby allowing the two parts 302 and 306 to be separated.

The embodiment of the releasable locking means 350 described above represents one way in which this locking feature can be accomplished. It will be appreciated that this structure may be modified to accomplish the same releasable locking objective without departing from the scope of the present invention.

Alternative embodiments for the bearing post are shown in FIGS. 11a and 11b. In particular, a bearing post 370 may include an end portion 372 having a first diameter and an end portion 374 having a second diameter less than the first diameter. Pin 360 would engage the end portion 372 to prohibit separation of the pivot members. End 376 of the end portion 374 may be riveted to retain one of the pivot members on the bearing post 370.

A bearing post 380 includes two end portions 382 and an intermediate portion 384 having a reduced diameter. Bearing post 380 is similar to the bearing 340 shown in FIG. 9, except that bearing post 380 does not include a head 346. Further, the reduced portion 384 is wider than the reduced portion 344. With the use of bearing post 380, two pivot members 330 may be used, each having a flange 334. Thus, two releasable locking means 350 would be employed. Two pins 360 would be used to engage both end portions 382 to lock the pivot members 330 in position on the bearing post 380. Removal of one of the pins 360 would permit separation of the two parts 302 and 306.

It will be appreciated that the pivot members and bearing posts may further be modified without departing from the scope of the present invention. For example, a bearing post similar to the post 370 may include threads on the end portion 374 so that it may be threaded into one of the parts to be joined. A sleeve such as 98 or 100 shown in FIG. 6 may be inserted in the axially extending opening through a pivot member such as, for example, pivot member 310. The sleeve might protrude slightly out of the opening to separate the two parts and to further provide a thrust bearing.

What is claimed is:

1. A pivot hinge for coupling two parts to each other to produce a concealed pivot joint, the pivot hinge comprising truncated bores in the two parts, pivot members for engaging the bores, each pivot member including a first portion having a leading end sized for insertion into one of the bores, means for securing the first portions of the pivot members in the truncated bores in fixed relationship to the parts, at least one of the pivot members including a second portion providing a thrust bearing between the two parts, bearing means for allowing the two pivot members to rotate relative to each other, and retaining means cooperating with said thrust bearing and said bearing means to prohibit separation of the pivot members.

2. The pivot hinge of claim 1 wherein the means for securing the first portion in the bore includes at least one circumferentially extending rib on the first portion for gripping the inner surface of the bore.

3. The pivot hinge of claim 1 wherein the means for securing the first portion in the bore includes a plurality of rib segments on the first portion for gripping the inner surface of the bore.

4. The pivot hinge of claim 3 wherein the rib segments are spaced apart intermittently on the first portion.

5. The pivot hinge of claim 1 wherein the means for securing the first portion in the bore includes a plurality of circumferentially extending ribs axially spaced apart on the first portion for gripping the inner surface of the bore.

6. The pivot hinge of claim 5 further comprising axially extending notches in the first portion providing rib segments.

7. The pivot hinge of claim 5 wherein the first portion is tapered inward toward the leading end, the first portion having a first outer dimension and a second outer dimension at the leading end which is less than the first outer dimension.

8. The pivot hinge of claim 7 wherein the ribs have an outer dimension generally equal to the first outer dimension of the first portion so that the depth of the space between the axially spaced ribs is progressively greater toward the leading end.

9. The pivot hinge of claim 7 wherein the first outer dimension of the first portion is greater than the inner dimension of the bore into which the first portion is inserted.

10. The pivot hinge of claim 7 wherein the retaining means includes releasable locking means which, when engaged, prohibits separation of the pivot members and, when disengaged, permits separation of the two members to allow separation of the parts.

11. The pivot hinge of claim 1 wherein the means for securing the first portion in the bore includes a plurality of ribs on the outer surface of the first portion, the ribs being axially spaced apart on the outer surface, and the outer surfaces being sloped inward toward the leading end so that the depth of the spaces between the ribs is progressively greater toward the leading end.

12. A pivot hinge for coupling two parts to each other to produce a concealed pivot joint, the pivot hinge comprising truncated bores in the two parts, two pivot members for engaging the bores, each pivot member including a first portion having an outer dimension sized for insertion into one of the bores, means for securing the portion of the pivot members in the truncated bores in fixed relationship to the parts, each pivot member further including an axially extending opening therethrough, at least one of he pivot members further including a second portion providing a thrust bearing between the two parts, bearing means received in the openings for allowing the two members to rotate relative to each other and releasable locking means for engaging said thrust bearing and bearing means which releasable locking means, when engaged, prohibits lateral separation of the two members and, when disengaged, permits separation of the two members to allow separation of the parts.

13. The pivot hinge of claim 12 wherein the releasable locking means is positioned between the joined parts.

14. The pivot hinge of claim 13 wherein the bearing means includes a bearing post, the post including a first portion having a first diameter and a second portion having a second diameter which is smaller than the first diameter.

15. The pivot hinge of claim 14 wherein the thrust bearing includes two spaced-apart holes extending transverse to its axis, the space between the holes being generally equal to the second diameter of the bearing post.

16. The pivot hinge of claim 15 wherein the releasable locking means includes a flexible pin insertable into the two spaced-apart holes to engage the bearing post to prohibit separation of the two pivot members.

17. A concealed pivot hinge for rotatably coupling two parts to each other comprising truncated bores in the two parts, pivot members for engaging the truncated bores in each part, each pivot member including a first portion having a leading end sized for insertion into the truncated bore in one of the parts, a plurality of ribs on the outer surface of the first portions for gripping the inner surfaces of the bores to secure the pivot members in fixed relationship to the parts, the ribs being axially spaced apart on the outer surfaces, the outer surfaces being sloped inward toward the leading ends so that the depth of the spaces between adjacent ribs gradually increases toward the leading ends, at least one of the pivot members including a second portion providing a thrust bearing between the two parts, bearing means for allowing the pivot members to rotate relative to each other, and retaining means cooperating with said thrust bearing and said bearing means to prohibit separation of the pivot members.

18. The pivot hinge of claim 17 wherein the retaining means includes releasable locking means which, when engaged, prohibits separation of the pivot members and, when disengaged, permits separation of the two members to allow separation of the parts.

* * * * *